United States Patent [19]

Starcke et al.

[11] Patent Number: 5,733,622
[45] Date of Patent: Mar. 31, 1998

[54] EDGE STRENGTHENED SUBSTRATE OF A DATA STORAGE DISK AND METHOD FOR FABRICATING SAME

[75] Inventors: Steven Francis Starcke, Rochester, Minn.; John David Amundson, Appleton, Wis.; Douglas Howard Piltingsrud, Rochester, Minn.

[73] Assignee: International Business Machines Corporation, Armonk, N.Y.

[21] Appl. No.: 477,870

[22] Filed: Jun. 7, 1995

[51] Int. Cl.⁶ .................................................. B32B 3/00
[52] U.S. Cl. .................. 428/64.1; 428/64.4; 428/65.3; 428/410; 428/426; 428/913; 270/495.1; 270/945; 369/283; 369/288; 65/30.13; 65/30.14
[58] Field of Search .................... 428/64.1, 64.2, 428/64.4, 65.3, 410, 426, 457, 913; 270/495.1, 945; 369/283, 288; 65/30.13, 30.14

[56] References Cited

U.S. PATENT DOCUMENTS

| | | |
|---|---|---|
| 4,483,700 | 11/1984 | Forker, Jr. et al. . |
| 4,671,814 | 6/1987 | Aratani et al. . |
| 4,803,106 | 2/1989 | Lenhart et al. . |
| 4,859,636 | 8/1989 | Aratani et al. . |
| 4,872,896 | 10/1989 | LaCourse et al. . |
| 4,874,414 | 10/1989 | Kaite et al. . |
| 4,875,920 | 10/1989 | Myers . |
| 4,911,743 | 3/1990 | Bagby . |
| 5,007,948 | 4/1991 | Araujo . |
| 5,085,910 | 2/1992 | Matsuhima et al. .................... 428/64 |
| 5,127,931 | 7/1992 | Kiefer et al. . |
| 5,569,518 | 10/1996 | Hayashi ................................ 428/141 |

*Primary Examiner*—Elizabeth Evans
*Attorney, Agent, or Firm*—Mark A. Hollingsowrth; Matthew J. Bussan

[57] ABSTRACT

An edge strengthened substrate of a data storage disk and a method for fabricating same is disclosed. A strengthening agent is preferably applied to selected portions of a disk-shaped glass substrate to increase the overall strength of the glass substrate. In one embodiment, a strengthening agent is preferably applied along an inner diameter portion of a disk-shaped glass substrate. A binder is preferably mixed with the strengthening agent to limit the mobility of the strengthening agent to the selected inner diameter portion of the substrate during the strengthening process. The glass substrate is then heated to a diffusion temperature for a sufficient duration of time to permit diffusion of the strengthening agent into the glass substrate. Selective application of a strengthening agent to an outer diameter portion of the glass substrate may be performed to further strengthen the glass substrate. Further application of a strengthening agent to an intermediate diameter surface portion of the glass substrate defined substantially between the inner and outer diameter portions may be performed to further increase the strength of the glass substrate.

22 Claims, 8 Drawing Sheets

GLASS SUBSTRATE PROCESSING DATA

| DISK SAMPLE (Number) | (A) FULL-SURFACE STRENGTHENING | (B) INNER AND OUTER DIAMETER STRENGTHENING | (C) INNER, OUTER DIAMETER, AND FULL-SURFACE STRENGTHENING |
|---|---|---|---|
| 1 | 29.0 | *14.8 | 64.0 |
| 2 | 24.5 | *15.0 | 52.0 |
| 3 | 24.5 | 36.8 | 65.5 |
| 4 | 18.5 | 27.8 | *11.5 |
| 5 | 31.5 | *19.8 | 48.0 |
| 6 | 20.5 | 41.0 | 45.5 |
| 7 | 25.0 | 36.2 | 61.5 |
| 8 | *11.0 | *18.2 | 42.3 |
| 9 | 19.0 | 23.2 | 49.3 |
| 10 | *12.0 | 25.8 | 60.5 |
| 11 | *14.5 | 31.4 | 47.0 |
| 12 | 19.0 | 26.2 | 49.5 |
| RAW AVERAGE/ ADJUSTED AVG. | 20.8/23.5 | 26.4/31.1 | 49.7/53.2 |

*RAW DATA POINT IGNORED WHEN COMPUTING ADJUSTED DATA

EDGE STRENGTHENED SUBSTRATE OF A DATA STORAGE DISK AND METHOD FOR FABRICATING SAME

FIELD OF THE INVENTION

The present invention relates generally to data storage systems, and, more particularly, to an edge strengthened data storage disk substrate and a method for fabricating same.

BACKGROUND OF THE INVENTION

It is well-known that a glass article may be strengthened by uniform development of compressive stresses within a surface layer of the glass article. A variety of known chemical strengthening methods have been developed to strengthen glass articles by exchanging ions between the surfaces of a glass article and an external ion source. A conventional ion exchange strengthening process is generally performed at a processing temperature below the annealing point of a particular glass specimen, and is often referred to as a low-temperature glass strengthening process.

In accordance with a conventional glass strengthening method, a glass article is contacted with a source of alkali metal ions, such as potassium, sodium, or silver ions, which have relatively large ionic radii in comparison to the radii of the dominant ions, such as sodium ions or lithium ions, of the glass article. At a processing temperature below the annealing temperature of the glass article, the strengthening method effectuates the exchange of the larger alkali or silver metal ions for the relatively smaller alkali metal ions in the surfaces of the glass article.

A significant problem associated with conventional ion exchange glass strengthening methods concerns an appreciable degree of residual warping in the glass article upon completion of the conventional chemical strengthening process. A moderate degree of residual warpage may often be tolerable when processing glass articles for use in applications requiring modest levels of surface uniformity, such as in household window applications, for example. In high-precision applications, such as the fabrication of optical or magnetic data storage disks, however, even minimal levels of warpage or flatness deviations may have catastrophic consequences, such as an irreparable loss of information stored on the data storage disks due to unintended contact between the disk surface and a read/write transducer. Flatness deviations on the order of microns are typically unacceptable in such high-precision applications.

A number of glass strengthening techniques have been developed to specifically address the relatively stringent surface uniformity tolerances associated with the fabrication of disk-shaped glass articles suitable for use in the manufacturing of conventional magnetizable data storage disks. One conventional method, as disclosed in U.S. Pat. No. 4,803,106 (hereinafter the '106 patent) is generally representative of the current state of the art by which both of the flat surfaces of a disk-shaped glass article are subjected to a chemical strengthening process. As disclosed in the '106 patent, a disk-shaped glass article is placed for a predetermined time in a molten potassium nitrate ($KNO_3$) bath heated to a temperature below the annealing temperature of the glass article. A relatively small percentage by weight of $AgNo_3$ is generally added to the $KNO_3$ melt.

Figure 1:
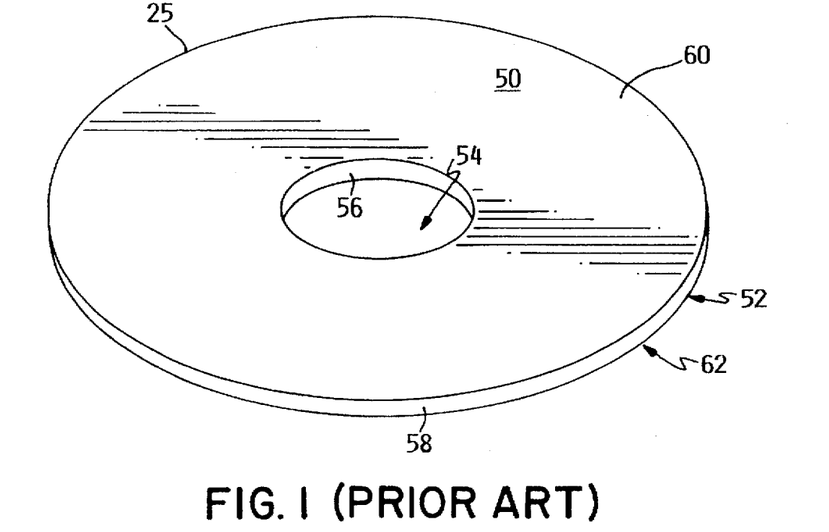
FIG. 1 is an illustration of a chemically strengthened substrate for a data storage disk fabricated in accordance with a conventional full-surface chemical strengthening process.
Figure 2:
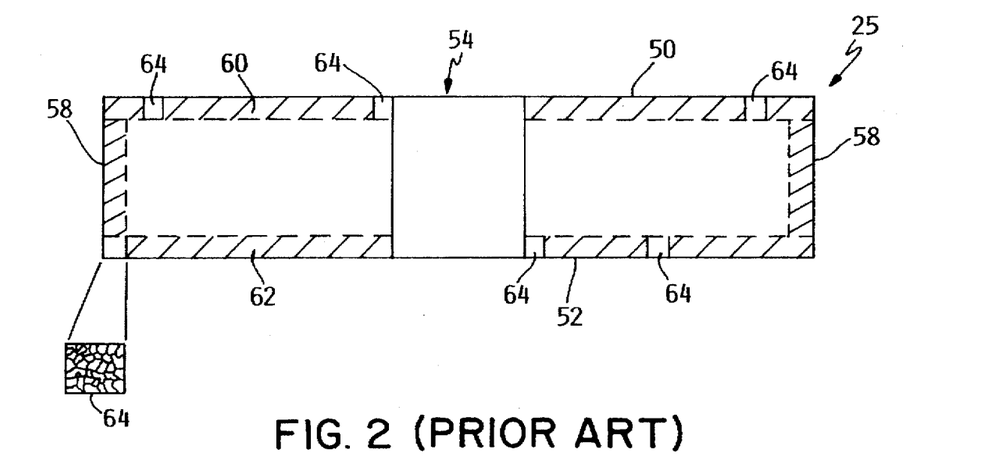
FIG. 2 is a cross-sectional view of a conventional disk-shaped glass substrate strengthened using a conventional chemical strengthening process which promotes substrate warpage.

FIGS. 1 and 2 are generally illustrative of known conventional methods for chemically strengthening disk-shaped glass articles. The prior art disk-shaped glass article 25 shown in FIGS. 1 and 2 includes an upper surface 50 and a lower surface 52. In accordance with a conventional full-surface chemical strengthening process, immersion of the disk-shaped glass article 25 into a molten salt ion exchange bath results in the production of an upper diffusion layer 60 and a lower diffusion layer 62 respectively developed on the upper and lower surfaces 50 and 52 of the glass article 25. The outer diameter edge 58 of the disk-shaped glass article 25 is then subjected to grinding in accordance with a known grinding method. The inner diameter edge 56 may also be subject to grinding.

As depicted in FIG. 2, a conventional disk-shaped glass article 25 processed in accordance with a conventional ion exchange chemical strengthening method can result in unacceptable levels of disk surface warpage. In general, the magnitude of residual disk surface warpage increases exponentially as the strength of the glass article 25 is increased. It has been determined that such conventional chemical strengthening methods generally produce disk-shaped glass articles that experience varying degrees of unacceptable warpage when attempting to increase the strength of the glass article 25 beyond commonly recognized standard strength levels. It is noted that conventional data storage disks generally exhibit relatively low levels of strength due to the present inability in the industry to control disk warpage.

In general usage, a data storage disk fabricated using a conventionally strengthened disk-shaped glass article 25 includes a central aperture 54 configured to the dimensions of the hub of a spindle motor of a direct access storage device (DASD). A disk clamping mechanism is generally employed to produce compressive axial forces concentrated around the inner diameter 56 of the disk 25 at levels sufficient to secure the disk 25 to the hub of the spindle motor. The relatively large axial forces concentrated near the inner diameter 56 of the disk 25 generally results in the production of tiny microcracks 64 in the disk, which are known by those skilled in the art to dramatically reduce the strength of a conventionally strengthened data storage disk. It has been determined that the occurrence of microcracks 64 is generally more pronounced near the inner diameter 56 of a conventional disk 25, but also develop at other diameter locations of the disk 25.

It is generally recognized that conventional glass strengthening methods that chemically treat the entire glass article generally result in placing both surfaces of the disk-shaped glass article 25 into a state of relatively high compressive stress. This resulting state of high compressive stress generally increases the durability of disk-shaped glass articles by inhibiting the development of tensile stresses on the surfaces of the glass article. Those skilled in the art generally recognize that this full-surface chemical strengthening process is relatively effective in inhibiting glass article 25 breakage, but disadvantageously induces unacceptable levels of disk surface warpage when attempting to strengthen disk-shaped glass articles beyond commonly recognized standard strength levels.

Advancements in portable computer-based systems, such as the development of notebook and palm-sized computers, have challenged the manufacturers of DASDs and other storage devices to produce systems capable of withstanding appreciable levels of externally induced shock. Dropping and bumping a computer system within which a DASD is housed, for example, can dramatically effect the performance and service life of the DASD. Such mishandling of the portable computer system typically results in the production of short duration shock vibrations that are transmitted to the sensitive components of the DASD, and severely impact the operation and service life of the DASD components.

Of particular concern is the durability of the disk-shaped glass disks that are rotated at relatively high rates of rotation within the DASD housing. Emerging reliability specifications for data storage disks designed for use in portable computer systems generally specify minimal shock resistance values in excess of 1,000 g. Compounding the inherent difficulties of fabricating a sufficiently durable glass data storage disk for use in portable computer systems is the demand placed on DASD manufacturers to continuously increase the data storage capacity of such disks. It is generally recognized that minimizing the clearance distance between a read/write transducer and the data storing portion of a data storage disk generally provides for increased recording densities. It is also appreciated in the art, however, that the flatness of the data storing surface of a disk becomes a critical factor and design constraint when attempting to minimize the nominal transducer-to-disk clearance distance. It is anticipated that transducer-to-disk clearance distances in the range of approximately 30 to 60 nanometers will become standard design parameters for future high-performance, small form factor DASDs. A significant decrease in transducer-to-disk clearance provided by the use of highly uniform recording surfaces can advantageously result in increased transducer readback signal sensitivity and increased data storage disk recording densities.

It has been determined that conventional methods for chemically strengthening disk-shaped glass articles, such as the method disclosed in the '106 patent, for example, generally produce unacceptable levels of disk warpage, often termed coning, that render the disks unusable for application in highly reliable DASDs and portable computer systems. Moreover, such conventional glass strengthening processes require numerous process steps and an appreciable number of hours to complete, typically on the order of sixteen to thirty hours, thus increasing the overall cost of producing data storage disks.

There exists in the data storage system manufacturing industry a keenly felt need to provide data storage disks having superior breakage resistance and surface uniformity characteristics, and a method for fabricating same. There exists a further need to provide such a disk fabrication process that substantially reduces production cycle times and costs as compared to conventional chemical strengthening processes. The present invention fulfills these and other needs.

SUMMARY OF THE INVENTION

The present invention is an edge strengthened substrate of a data storage disk and a method for fabricating same. A strengthening agent is preferably applied to selected portions of a disk-shaped glass substrate to increase the overall strength of the glass substrate. In one embodiment, a strengthening agent is preferably applied along an inner diameter portion of a disk-shaped glass substrate. A binder is preferably mixed with the strengthening agent to limit the mobility of the agent to the selected inner diameter portion of the substrate during the strengthening process. The glass substrate is then heated to a diffusion temperature for a sufficient duration of time to permit diffusion of the strengthening agent into the glass substrate. Selective application of a strengthening agent to an outer diameter portion of the glass substrate may be performed to further strengthen the glass substrate. Further application of a strengthening agent to an intermediate diameter surface portion of the glass substrate defined substantially between the inner and outer diameter portions may be performed to further increase the strength of the glass substrate.

DETAILED DESCRIPTION OF THE PREFERRED EMBODIMENTS

Figure 3:
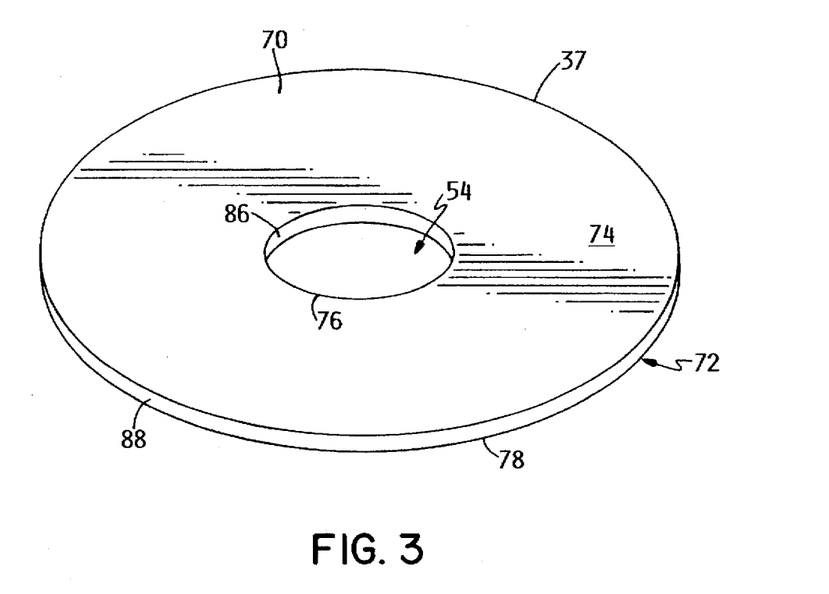
FIG. 3 is a top perspective view of a novel edge strengthened disk-shaped glass substrate having a chemically strengthened inner diameter edge portion in accordance with a novel selective chemical strengthening method.
Figure 4:
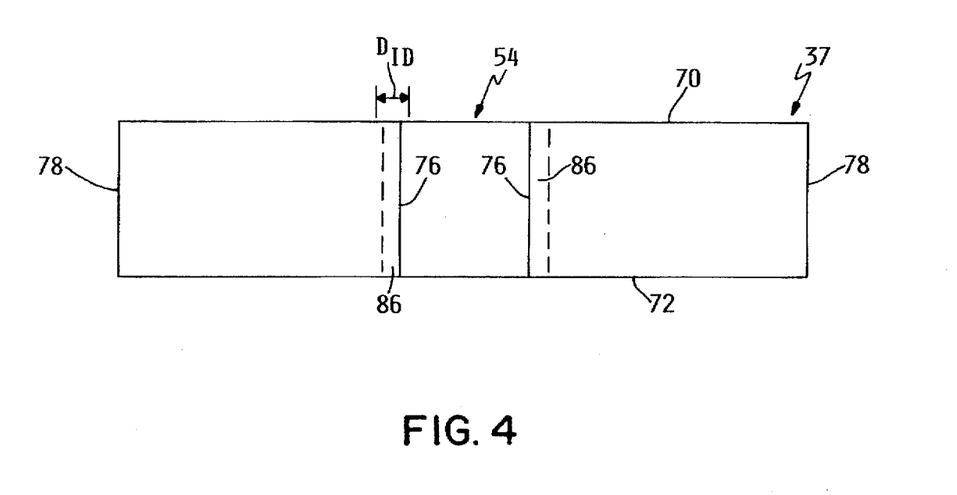
FIG. 4 is a cross-sectional view of a disk-shaped glass substrate having a strengthened inner diameter edge portion in accordance with a novel selective chemical strengthening method.

Referring now to the drawings, and, more particularly, to FIGS. 3 and 4, there is shown an illustration of one embodiment of a disk-shaped glass substrate 37 subjected to a novel chemical edge strengthening process. The glass substrate 37 includes an upper surface 70, a lower surface 72, an inner diameter edge 76, and an outer diameter edge 78. In accordance with the embodiment illustrated in FIG. 4, only an inner diameter edge portion 76 of the glass substrate 37 is subjected to chemical strengthening to produce an inner diameter diffusion layer 86. Development of the inner diameter diffusion layer 86 to a sufficient depth $D_{ID}$ provides for substantial strengthening of the inner diameter portion of the glass substrate 37 which is generally subjected to the highest level of compressive axial loading produced by a disk clamping apparatus.

In general, the depth $D_{ID}$ of the inner diameter diffusion layer 86 is typically a function of the depth of residual microcracks produced during normal manufacturing of the glass substrate 37 and the anticipated level of axial loading produced by a clamping apparatus commonly employed to secure the data storage disk 37 to the hub of a spindle motor for rotation thereon. The depth $D_{ID}$ of the inner diameter diffusion layer 86, as well as other portions of the glass substrate 37 subjected to selective chemical strengthening, should be developed to a depth below which such residual microcracks are generally not formed. Those skilled in the art will immediately appreciate the substantial cost and time savings resulting from chemically strengthening only a selected portion of a glass substrate 37, such as an inner diameter portion of the disk substrate 37, rather than subjecting the entire disk substrate to a conventional full-surface chemical strengthening process.

A glass substrate 37 subjected to selective chemical strengthening at an inner diameter portion of the substrate 37, as illustrated in FIG. 4, advantageously provides for substantially warp-free upper and lower disk surfaces 70 and 72 which is essential for producing highly reliable and relatively defect-free data storage disks. By selectively strengthening only a portion of the disk substrate 37, undesirable disk warpage associated with conventional chemical strengthening methods is altogether avoided.

Figure 5:
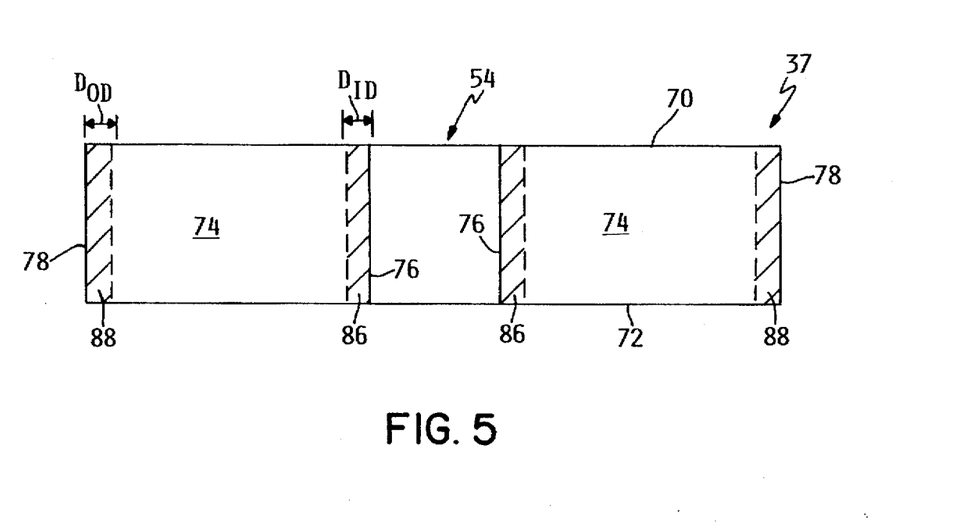
FIG. 5 is a cross-sectional view of an embodiment of a novel disk-shaped glass substrate subjected to selective chemical strengthening at an inner diameter edge portion and at an outer diameter edge portion.
Figure 6:
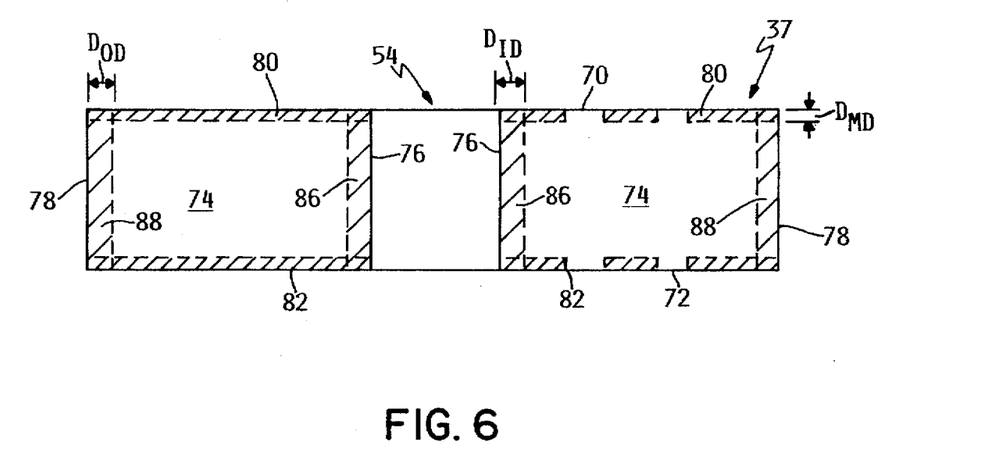
FIG. 6 is a cross-sectional view of another embodiment of a novel disk-shaped glass substrate having a selectively strengthened inner diameter edge portion, outer diameter edge portion, and an intermediate diameter surface portion defined substantially between the inner and outer diameter edge portions.

Turning now to FIGS. 5 and 6, there are shown two alternative embodiments of a chemically strengthened disk-shaped glass substrate 37 strengthened in accordance with a novel selective edge strengthening method. In FIG. 5, a disk-shaped glass substrate 37 is selectively subjected to chemical strengthening at an inner diameter portion and an outer diameter portion of the disk substrate 37. An inner diameter diffusion layer 86 is preferably developed along an inner diameter edge portion 76 of the glass substrate 37. Additionally, an outer diameter edge portion 78 of the glass substrate 37 is preferably subjected to selective chemical strengthening to produce an outer diameter diffusion layer 88. In one embodiment, the inner diameter diffusion layer 86 is preferably developed to a depth $D_{ID}$ within the range of approximately 1 micron to approximately 100 microns. The outer diameter diffusion layer 88 is preferably developed to a depth $D_{OD}$ of approximately 1 micron to approximately 200 microns. It has been determined that the selective inner and outer diameter glass strengthening process illustrated in FIG. 5 results in a substantially strengthened disk-shaped substrate 37 suitable for subsequent processing as a data storage disk having superior precision recording surfaces.

Another embodiment of a disk-shaped glass substrate 37 subjected to chemical strengthening at selected locations is depicted in FIG. 6. In a manner similar to that described with respect to FIG. 5, an inner diameter diffusion layer 86 is developed at an inner diameter edge portion 76 of the glass substrate 37. An outer diameter diffusion layer 88 is also preferably developed along an outer diameter edge portion 78 of the glass substrate 37. Additionally, it may be desirable to subject an intermediate diameter surface portion 74 of the glass substrate 37 to chemical strengthening. It is noted that the intermediate diameter surface portion 74 is preferably a surface portion of the glass substrate 37 defined substantially between the inner diameter diffusion layer 86 and the outer diameter diffusion layer 88.

In one embodiment, upper and lower intermediate diffusion layers 80 and 82 are respectively developed on the upper and lower surfaces 70 and 72 of the glass substrate 37 defined substantially between the inner and outer diameter diffusion layers 86 and 88. In another embodiment, selected portions of the upper and lower substrate surfaces 70 and 72 are subjected to selective chemical strengthening to respectively develop one or more upper and lower intermediate diffusion portions 80 and 82 defined substantially between the inner and outer diameter diffusion layers 86 and 88. It is noted that the upper and lower intermediate diffusion layers or portions 80 and 82 are preferably developed to a depth $D_{MD}$ that is more shallow than either of the inner and outer diameter diffusion layers 86 and 88. In one embodiment, the depth $D_{MD}$ of the upper and lower intermediate diffusion layers or portions 80 and 82 range between approximately 1 micron to approximately 20 microns.

Still referring to the embodiments illustrated in FIGS. 3–6, a preferred method for selectively strengthening a disk-shaped glass substrate 37 will now be disclosed. In the embodiment illustrated in FIG. 4, a strengthening agent is preferably applied along the inner diameter edge portion 76 of the glass substrate 37. In one embodiment, a binder is mixed with the strengthening agent to limit the mobility of the strengthening agent to the inner diameter edge portion 76 of the disk 37 during the strengthening process. The substrate 37 is then heated preferably to a diffusion temperature associated with the strengthening agent for a predetermined duration of time required for the strengthening agent to diffuse into the inner diameter edge portion 76 to a desired depth $D_{ID}$.

A significant advantage of the novel selective edge strengthening method concerns a substantial decrease in cycle time required to chemically strengthen a glass substrate 37. Cycle times on the order of one hour are generally achievable when employing a novel selective edge strengthening method as disclosed herein. It is noted for purposes of comparison, that cycle times on the order of 16 to 20 hours per glass substrate 37 are typical when strengthening glass substrates in accordance with conventional full-surface chemical strengthening methods.

In one embodiment, the strengthening agent applied to the inner diameter edge portion 76 of the disk 37 to produce the inner diameter diffusion layer 86 comprises potassium nitrate ($KNO_3$). The strengthening agent may instead comprise silver nitrate ($AgNO_3$) or, alternatively, sodium nitrate ($NaNO_3$). In another embodiment, a mixture of potassium and silver nitrate may be applied to the glass substrate 37 to produce the inner diameter diffusion layer 86. It is noted that the type of strengthening agent employed when performing a novel selective chemical strengthening process is generally dependent on the type of glass used to fabricate the glass substrate 37. For example, a glass substrate 37 fabricated from sodium silica, commonly referred to as soda lime, should be subjected to selective chemical strengthening using a strengthening agent comprising $KNO_3$ or $AgNO_3$. A glass substrate 37 fabricated from aluminum silicate should be subjected to selective chemical strengthening using a strengthening agent comprising $NaNO_3$ or $AgNO_3$. It may be desirable to limit the mobility of the strengthening agent to the selected portion of the glass substrate 37 by mixing the strengthening agent with a binder that preferably comprises silicon carbide.

In accordance with the embodiment illustrated in FIG. 5, the strengthening agent is applied to both the inner diameter edge portion 76 and outer diameter edge portion 78 of the glass substrate 37. A binder may similarly be mixed with a strengthening agent to limit the mobility of the strengthening agent during the heating and diffusion process as previously discussed. After heating the disk substrate 37 to the diffusion temperature associated with the glass type and strengthening agent for the required diffusion time, the inner diameter diffusion layer 86 and/or outer diameter diffusion layer 88 is preferably developed to a depth $D_{ID}$ and/or depth $D_{OD}$ of approximately 10 microns. It is noted that the diffusion temperature varies depending on the annealing temperature associated with a particular type of glass, and is generally appreciably lower than the associated annealing temperature. It is further noted that the annealing temperature for disparate glass types varies greatly. Sodium silica, for example, has an annealing temperature of approximately 514 degrees centigrade, while aluminum silicate (general) has an annealing temperature of approximately 712 degrees centigrade.

With reference to FIG. 6, an inner and outer diameter diffusion layer 86 and 88 are preferably developed in a manner similar to that described previously with respect to FIG. 5. Additionally, a strengthening agent may be applied over the surface or portions of the surface of an intermediate diameter surface portion 74 defined substantially between the inner and outer diffusion layers 86 and 88. In one embodiment, the diffusion layers 80 and 82 at intermediate diameter surface portions 74 of the disk substrate 37 are preferably developed to a depth of $D_{MD}$ of approximately 2 microns.

In general, typical diffusion temperatures range between approximately 350 and 650 degrees centigrade when using a $KNO_3$ type strengthening agent for varying types of glass, and between approximately 334 and 450 degree centigrade when using a $AgNO_3$ type strengthening agent. The time required to diffuse the strengthening agent to the desired depth along the inner and outer diameter edge portions 74 and 76, as well as into the intermediate diameter surface portions 80 and 82, typically range between 1 and 16 hours. It is noted that the dimensions and material composition of the disk substrate 37 and strengthening and binder agents may require deviation from these generalized time and temperature process parameters. For example, the diffusion time and temperature may vary depending on the specific mixture of the strengthening agent, binder components, and glass type. A strengthening agent comprising approximately 99 percent potassium nitrate and approximately 1 percent silver nitrate applied selectively to either one of the inner diameter edge portion 76 and the outer diameter edge portion 78 of a disk substrate 37 will typically require application of heat at a diffusion temperature of approximately 400 degrees centigrade for approximately 1 hour. It is further noted that a mixture of the strengthening agent and the binder at a ratio of approximately 1:1 has been found to be effective in limiting the mobility of the strengthening agent during the novel selective edge strengthening process.

Figure 7:
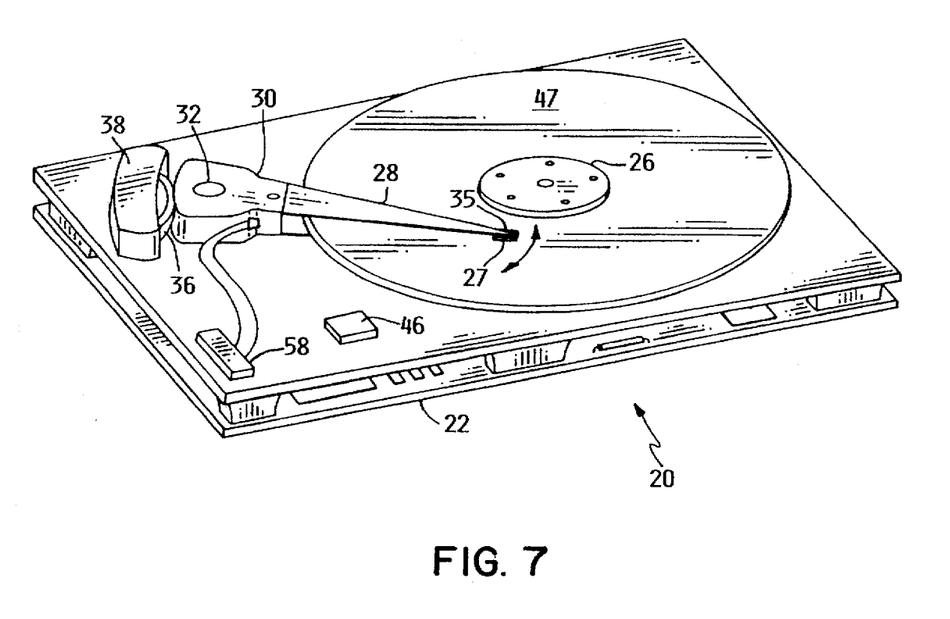
FIG. 7 is a top perspective view of a direct access storage system (DASD) employing one or more data storage disks fabricated from glass substrates subjected to a novel selective chemical edge-strengthening method.
Figure 8:
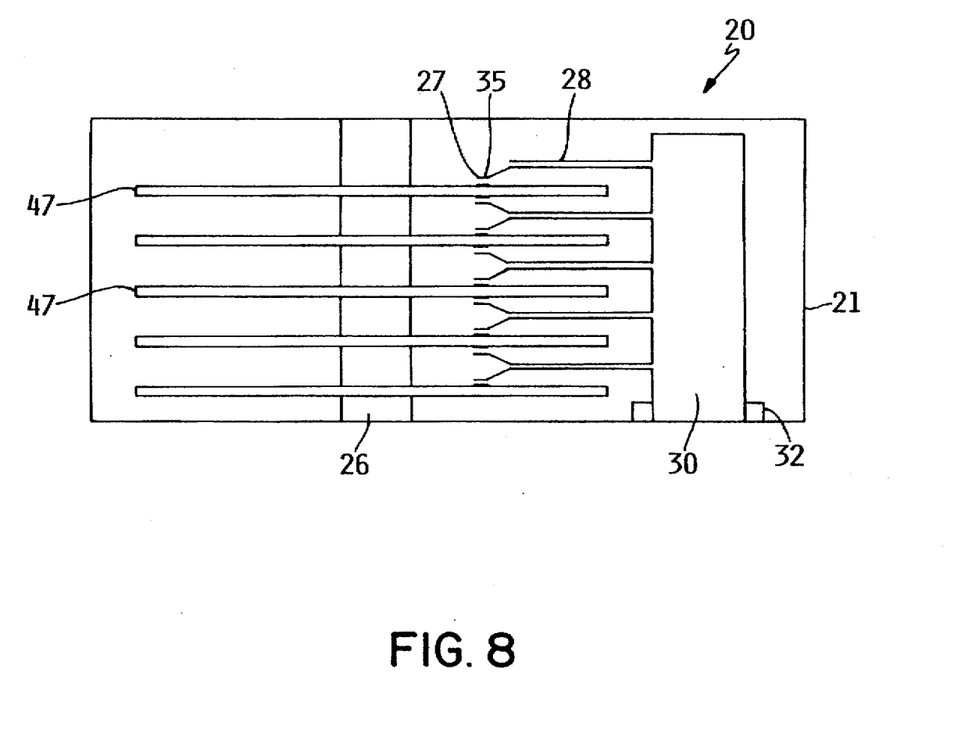
FIG. 8 is a side plan view of a DASD employing a plurality of data storage disks fabricated from selectively edge strengthened glass substrates.

A glass substrate 37 strengthened in accordance with a novel selective edge strengthening process is preferably used when fabricating one or more data storage disks designed for use in a direct access storage system (DASD). Referring now to FIG. 7, there is shown a DASD 20 with a cover 23 removed from the base 22 of the DASD housing 21. A DASD 20, as shown in FIGS. 7 and 8, typically includes one or more rigid data storage disks 47 which are stacked coaxially in a tandem spaced relationship, and rotate about a spindle motor 26 at a relatively high rate of rotation. Each disk 47 is typically formatted to include a plurality of spaced concentric tracks, with each track being partitioned into a series of sectors which, in turn, are further divided into individual information fields. One or more of the disks 47 may alternatively be formatted to include a spiralled track configuration.

An actuator 30 typically includes a plurality of interleaved actuator arms 28, with each arm 28 having one or more transducer 27 and slider 35 assemblies mounted thereon for writing and reading information to and from the data storage disks 47. The slider 35 is typically designed as an aerodynamic lifting body that lifts the transducer 27 off of the surface of the disk 47 as the rate of spindle motor 26 rotation increases, and causes the transducer 27 to hover above the disk 47 on an air bearing produced by high-speed rotation of the disk 47. A conformal lubricant may alternatively be applied to the disk surface 47 to reduce static and dynamic friction between a constant contact-type slider 35 and disk surface 47.

The actuator 30 is usually mounted to a stationary actuator shaft 32, and rotates on the shaft 32 to move the actuator arms 28 into and out of the stack of data storage disks 47. A coil assembly 36, mounted to a coil frame of the actuator 30, generally rotates in proximity to a permanent magnet structure 38, causing the actuator arms 28, in turn, to sweep over the surfaces of the data storage disks 47. The spindle motor 26 typically comprises a poly-phase a.c. motor or, alternatively, a d.c. motor, energized by a power supply 46 and adapted for rotating the data storage disks 47.

The coil assembly 36 and the permanent magnet structure 38 operate in cooperation as an actuator voice coil motor responsive to control signals produced by a controller 58. The actuator voice coil motor produces a torquing force on the coil frame of the actuator 30 when control currents of varying direction and magnitude flow in the coil assembly 36 in the presence of a magnetic field produced by the permanent magnet structure 38. The torquing forces imparted on the actuator coil frame, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 47, and cooperates with the actuator voice coil motor to move the actuator arms 28 and transducers 27 to prescribed track and sector locations when reading and writing data to and from the disks 47.

A trend has developed in the data storage system manufacturing community to miniaturize the chassis or housing 21 of a DASD 20 to a size suitable for incorporation into miniature personal computers, such as lap-top and pocket-sized computers, for example. Various industry standards have emerged that specify the external housing dimensions of small and very small form factor DASDs. One such recognized family of industry standards is the PCMCIA (Personal Computer Memory Card Industry Association) family of standards, which specifies both the dimensions for the DASD housing and the protocol for communicating control and data signals between the DASD and a host computer system coupled thereto.

Recently, four families or types of PCMCIA device specifications have emerged. By way of example, a Type-I PCMCIA device must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of a Type-III PCMCIA device, and Type-IV PCMCIA devices are characterized as having a maximum housing height dimension in excess of 10.5 mm. It is anticipated that the industry trend of continued miniaturization of DASDs will eventually result in the production of systems complying with the Type-II PCMCIA specification. Such Type-II PCMCIA DASDs will likely have external housing dimensions of approximately 54 mm×86 mm×5 mm, and include a data storage disk 47 having a diameter of approximately 45 mm and a width dimension similar to that of a standard credit card. In one embodiment, the DASD 20 illustrated in FIGS. 7 and 8 is preferably constrained within a housing 21 having a relatively small form factor that generally conforms to one or more of the PCMCIA housing specifications.

Reducing the size of a DASD housing 21 without sacrificing storage capacity is typically achieved by increasing the track density, or number of tracks-per-inch (TPI), of the data storage disk 47. It is generally desirable to reduce the separation distance between the slider/transducer assembly and the rotating data storage disk in order to increase the readback signal sensitivity of the transducer 27 to the typically weaker magnetic transitions associated with higher density disks. When decreasing the transducer-to-disk separation distance, however, the probability of detrimental contact between the sensitive transducer 27 and the disk surface due to unacceptable levels of disk warpage significantly increases. A data storage disk fabricated using a glass substrate 37 strengthened in accordance with a novel selective edge strengthening method as disclosed herein will typically exhibit superior surface uniformity and durability, thereby significantly reducing or eliminating the likelihood of unintended detrimental contact between the recording surfaces of the disk and a slider/transducer assembly.

Figure 9:
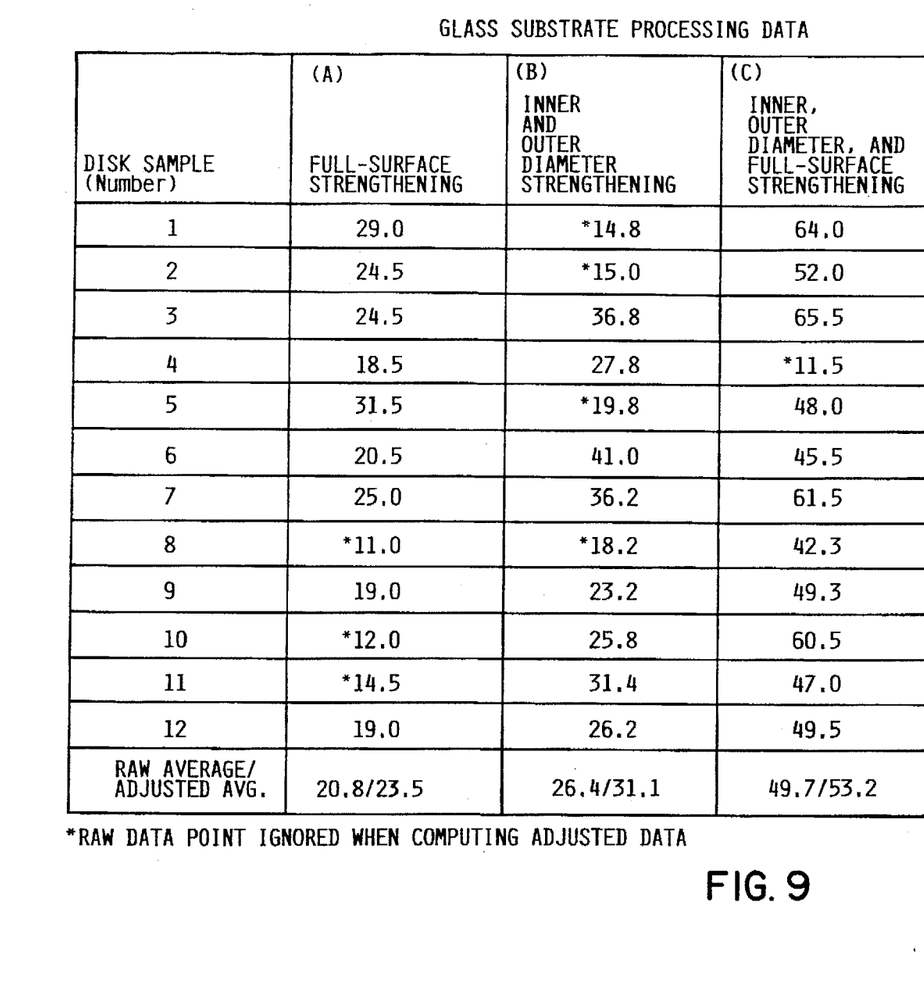
FIG. 9 is a table of empirical data derived from testing a plurality of disk-shaped glass substrates in accordance with various chemical strengthening processes, including a novel selective edge strengthening process.
Figure 10:
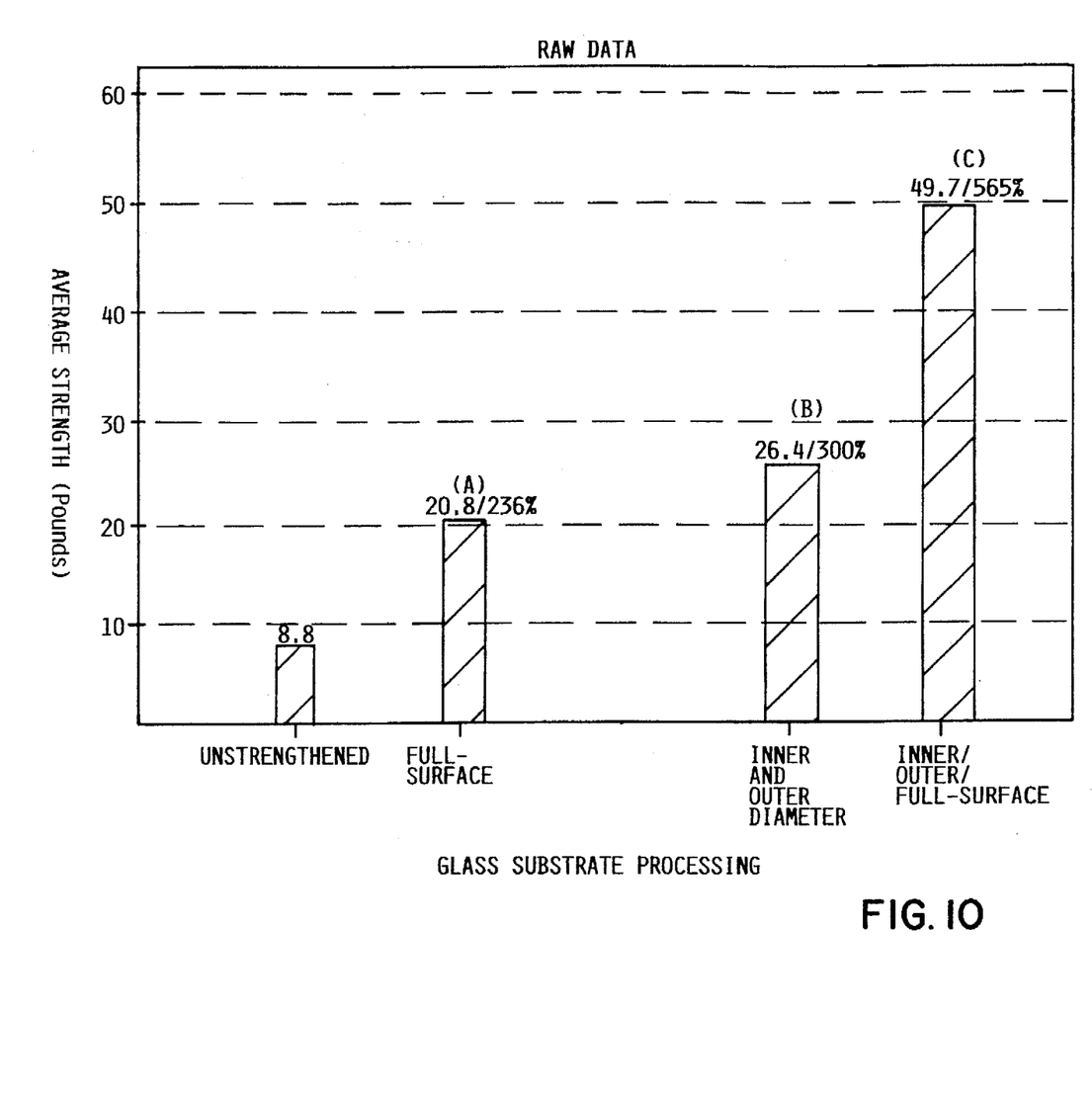
FIG. 10 is a graphical representation of the raw empirical data tabulated in FIG. 9 presented in bar chart form.
Figure 11:
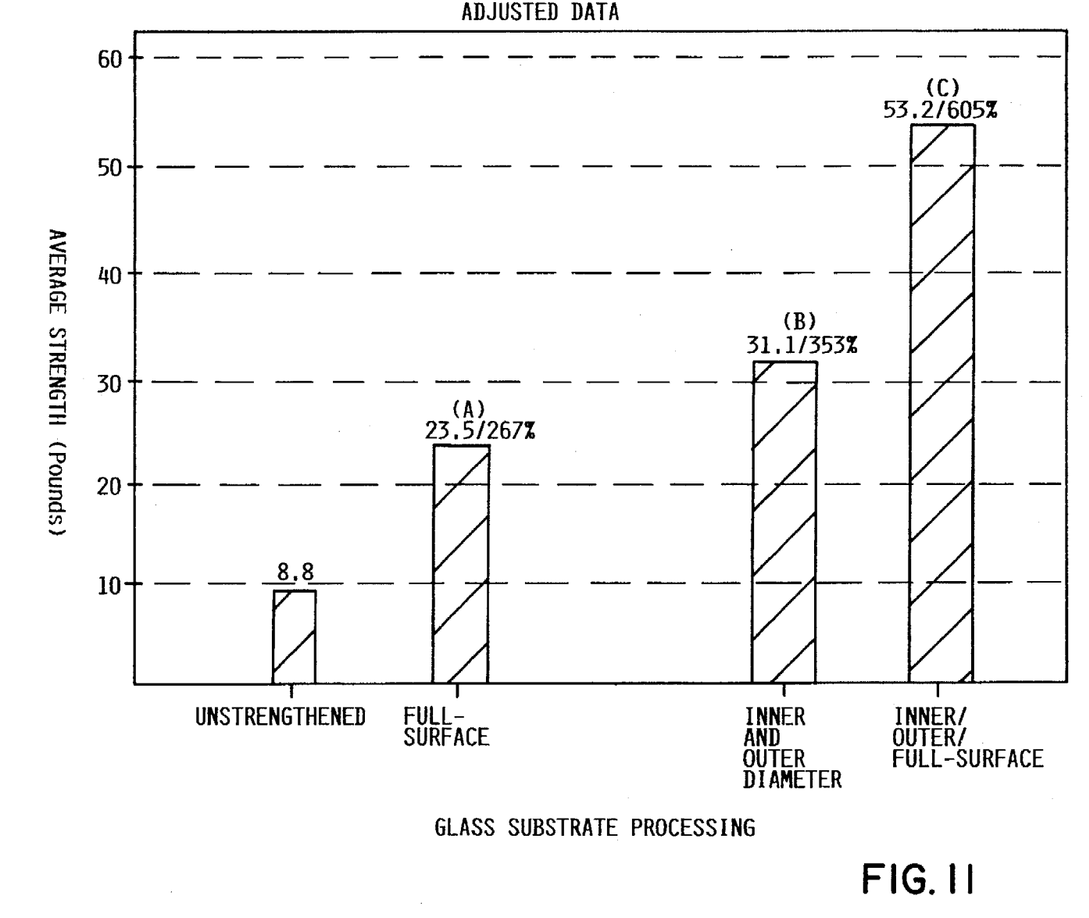
FIG. 11 is a bar chart representation of the adjusted empirical data tabulated in FIG. 9.

Turning now to FIGS. 9–11, the dramatic increases in the strength of disk substrates 37 processed in accordance with several of the disclosed selective edge strengthening methods are illustrated through the use of tabulated empirical data and bar charts. In columns (B) and (C) of FIG. 9, there is tabulated empirical data obtained when testing glass substrates 37 subjected to chemical strengthening in accordance with the novel strengthening methods described herein. A conventional strength tester was employed to determine an average strength associated with each of the tested disk substrates 37. The data values, expressed in terms of pounds force, are generally representative of the ability of the strengthened glass substrates 37 to withstand an equivalent amount of axial loading force. Initially, it was determined that, on average, an unstrengthened disk-shaped glass substrate 37 exhibits an average strength of approximately 8.8 pounds force prior to breakage or noticeable deterioration.

The empirical data tabulated in FIG. 9 was derived by strength testing three sets of twelve randomly selected disk-shaped glass substrates 37, and subjecting the three sets of substrates 37 to three distinct chemical strengthening processes. A first set of twelve glass substrates 37 was subjected to a full-surface chemical strengthening process for approximately one hour. This full-surface strengthening method is similar to the conventional strengthening method of fully immersing a disk substrate 37 into a molten salt ion exchange bath as previously discussed with respect to prior art FIGS. 1 and 2. Strength testing of the full-surface strengthened disk substrate 37 indicated an average strength of 20.8 pounds force prior to breakage or noticeable deterioration. The raw data obtained when testing the full-surface strengthened substrates 37 is tabulated in column (A) of FIG. 9.

Testing of another set of twelve glass substrates 37 subjected to selective chemical strengthening along an inner diameter edge portion 76 and an outer diameter edge portion 78, as illustrated in the embodiment shown in FIG. 5, demonstrates that these selectively strengthened substrates 37 exhibit an average strength of approximately 26.4 pounds force prior to breakage or noticeable deterioration. Test data for this set of substrates 37 is tabulated in column (B) of FIG. 9.

Finally, another set of twelve glass substrates 37 was subjected to selective chemical strengthening along inner and outer diameter edge portions 76 and 78, as well as an intermediate diameter surface portion 74 in a manner similar to that previously described with respect to FIG. 6. The test data, tabulated in column (C) of FIG. 9, demonstrates that a glass substrate 37 chemically strengthened in this manner exhibits an average strength of approximately 49.7 pounds force prior to breakage or noticeable deterioration. It is important to note that selective chemical strengthening of a disk substrate 37 in accordance with the novel methods described herein produced no appreciable warpage in the disk substrates 37.

Turning now to FIGS. 10 and 11, the empirical data tabulated in FIG. 9 is illustrated in bar chart form. In FIG. 10, the empirical data associated with each of the twelve disk-shaped glass substrates 37 tested in accordance with each of the three chemical strengthening methods is presented. It is noted that, on average, a glass substrate 37 subjected to selective strengthening at inner and outer diameter edge portions 76 and 78 provides for a 300% increase in strength over an unstrengthened glass substrate. A disk substrate 37 selectively strengthened at an intermediate diameter surface location 74 in addition to inner and outer diameter edge portions 76 and 78 provides for a 565% increase in strength over an unstrengthened disk substrate.

The adjusted data illustrated in bar chart form in FIG. 11 demonstrates even more dramatically the advantages of selectively strengthening portions of a glass substrate 37 in accordance with the novel chemical strengthening methods disclosed herein. It is noted that the data values identified with an asterisk in FIG. 9 were ignored when computing the average adjusted strength values represented in bar chart form in FIG. 11. A 353% increase in glass substrate 37 strength, for example, is realizable when subjecting the substrate 37 to inner and outer diameter edge 76 and 78 strengthening. More dramatically, a 605% increase in glass substrate 37 strength is realizable by selectively strengthening inner and outer diameter edge portions 76 and 78 in combination with an intermediate diameter surface portion 74 of the glass substrate 37 in accordance with the disclosed novel selective edge strengthening method.

It will, of course, be understood that various modifications and additions can be made to the embodiments discussed hereinabove without departing from the scope or spirit of the present invention. For example, the strengthened glass substrate 37 may be employed in the fabrication of data storage disk having diameters of 1.8", 2.5", 5.25", and 8", and be rotated at various rates of rotation. A data storage disk fabricated using a strengthened glass substrate 37 may be designed to store information magnetically, optically, or in other forms that are amenable to storage on a disk-shaped substrate. Further, a range of values for the parameters of the disclosed fabrication processes will generally be valid. Also, materials and manufacturing techniques other than those specified herein may be employed when fabricating the novel edge strengthened glass substrate 37. Moreover, the edge strengthened substrate 37 may be fabricated from glass or a composite of glass and ceramic, for example. Selective strengthening of one or more upper portions of a disk substrate exclusively or in combination with one or more lower portions of the disk substrate, for example, may be desirable. Accordingly, the scope of the present invention should not be limited to the particular embodiments discussed above, but should be defined only by the claims set forth below and equivalents of the disclosed embodiments.

What is claimed is:

1. A chemically strengthened data storage disk for use in a direct access storage system, comprising:

a disk-shaped substrate comprising glass and defining a central aperture, the substrate including an inner diameter portion, an outer diameter portion, and an intermediate diameter portion defined substantially between the inner and outer diameter portions; and a first strengthening agent diffused into the inner diameter portion of the substrate;

wherein the strength of the inner diameter portion of the substrate is greater than the strength of either one of the intermediate diameter portion and the outer diameter portion of the substrate.

2. A data storage disk as claimed in claim 1, further comprising:

a third strengthening agent diffused into the outer diameter portion of the substrate;

wherein the strength of either one of the inner diameter portion and the outer diameter portion is greater than the strength of the intermediate diameter portion.

3. A method claimed in claim 2, wherein the first strengthening agent and the third strengthening agent are substantially equivalent in composition.

4. A data storage disk as claimed in claim 2, wherein the first and third strengthening agents comprise at least potassium nitrate, silver nitrate, and sodium nitrate.

5. A data storage disk as claimed in claim 1, further comprising:

a second strengthening agent diffused into the intermediate diameter portion of the substrate; and a third strengthening agent diffused into the outer diameter portion of the substrate;

wherein the strength of either one of the inner diameter portion and the outer diameter portion is greater than the strength of the intermediate diameter portion.

6. A data storage disk as claimed in claim 1, further comprising:

a second strengthening agent diffused into the intermediate diameter portion of the substrate; and a third strengthening agent diffused into the outer diameter portion of the substrate;

wherein the concentration of either one of the first and the third strengthening agents is greater than the concentration of the second strengthening agent.

7. A data storage disk as claimed in claim 1, wherein the substrate is resistant to shock forces in excess of 1,000 g.

8. A data storage disk as claimed in claim 1, wherein:

the substrate includes an upper surface and a lower surface;

the inner diameter portion includes an inner diameter edge portion proximate the central aperture;

the outer diameter portion includes an outer diameter edge portion defined along the outer circumference of the substrate; and the intermediate diameter portion includes at least a portion of either one of the upper and lower substrate surfaces defined substantially between the inner and outer diameter edge portions;

further wherein the first strengthening agent is diffused into the inner diameter edge portion of the substrate, and the strength of the inner diameter edge portion of the substrate is greater than the strength of either one of the intermediate diameter portion and the outer diameter edge portion of the substrate.

9. A method of strengthening a substrate of a data storage disk for use in a direct access storage system, comprising the steps of:

providing a substantially glass disk-shaped substrate defining a central aperture and having an inner diameter portion and an outer diameter portion;

applying a strengthening agent selectively to at least one of the inner diameter portion and the outer diameter portion of the substrate; and heating the substrate at a diffusion temperature associated with the glass and strengthening agent;

wherein heating the substrate diffuses the strengthening agent into the at least one of the inner diameter portion and the outer diameter portion of the substrate.

10. A method claimed in claim 9, including the further step of mixing the strengthening agent with a binder.

11. A method claimed in claim 10, wherein the mixing step includes the step of mixing a binder comprising at least silicon carbide with the strengthening agent.

12. A method claimed in claim 9, wherein:

the disk-shaped substrate includes an intermediate diameter portion defined substantially between the inner and outer diameter portions of the substrate; and the method includes the further step of applying a second strengthening agent to the intermediate diameter portion, the concentration of the second strengthening agent diffused into the intermediate diameter portion being different from the concentration of the strengthening agent diffused selectively into the at least one of the inner diameter portion and the outer diameter portion of the substrate.

13. A method claimed in claim 12, wherein the strengthening agent and the second strengthening agent are substantially equivalent in composition.

14. A method claimed in claim 12, wherein the concentration of the second strengthening agent diffused into the intermediate diameter portion is less than the concentration of the strengthening agent diffused selectively into the at least one of the inner diameter portion and the outer diameter portion of the substrate.

15. A method claimed in claim 12, wherein the second strengthening agent is diffused into the substrate substantially within the intermediate diameter portion to a depth that is less than a depth to which the strengthening agent is diffused selectively into the at least one of the inner diameter portion and the outer diameter portion of the substrate.

16. A method claimed in claim 9, wherein the method steps are performed substantially within a time period of approximately 0.5 hours to approximately 2.0 hours.

17. A method claimed in claim 9, wherein the step of applying the strengthening agent includes the step of applying a strengthening agent comprising at least one of potassium nitrate, silver nitrate and sodium nitrate.

18. A method claimed in claim 9, wherein:

the disk-shaped substrate includes an intermediate diameter portion defined substantially between the inner and outer diameter portions; and the method includes the further step of strengthening the substrate substantially within the intermediate diameter portion of the substrate.

19. A direct access storage device having a housing, the device comprising:

a spindle motor mounted to the housing;

an actuator movably mounted to the housing;

a transducer mounted to the actuator; and a chemically strengthened data storage disk mounted to the spindle motor, comprising:

a disk-shaped substrate comprising glass and defining a central aperture, the substrate including an inner diameter portion, an outer diameter portion, and an intermediate diameter portion defined between the inner and outer diameter portions; and a first strengthening agent diffused into the inner diameter portion of the substrate;

wherein the strength of the inner diameter portion of the substrate is greater than the strength of either one of the intermediate diameter portion and the outer diameter portion of the substrate.

20. A data storage disk as claimed in claim 19, further comprising:

a third strengthening agent diffused into the outer diameter portion of the substrate;

wherein the strength of either one of the inner diameter portion and the outer diameter portion is greater than the strength of the intermediate diameter portion.

21. A data storage disk as claimed in claim 19, further comprising:

a second strengthening agent diffused into the intermediate diameter portion of the substrate; and a third strengthening agent diffused into the outer diameter portion of the substrate;

wherein the strength of either one of the inner diameter portion and the outer diameter portion is greater than the strength of the intermediate diameter portion.

22. A data storage disk as claimed in claim 19, wherein the substrate is resistant to shock forces in excess of 1,000 g.

* * * * *